US011317053B2

United States Patent
Zhu et al.

(10) Patent No.: US 11,317,053 B2
(45) Date of Patent: Apr. 26, 2022

(54) ELECTRONIC DEVICES AND CORRESPONDING METHODS FOR CAPTURING IMAGES FROM AN EXTERNAL DISPLAY OF A REMOTE ELECTRONIC DEVICE

(71) Applicant: Motorola Mobility LLC, Chicago, IL (US)

(72) Inventors: Xiaofeng Zhu, Nanjing (CN); Weiqi Tang, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 260 days.

(21) Appl. No.: 16/854,556

(22) Filed: Apr. 21, 2020

(65) Prior Publication Data

US 2021/0297626 A1    Sep. 23, 2021

(30) Foreign Application Priority Data

Mar. 18, 2020 (CN) .......................... 202010190028.1

(51) Int. Cl.
*H04N 7/01* (2006.01)
*H04N 7/08* (2006.01)
(Continued)

(52) U.S. Cl.
CPC ......... *H04N 7/0117* (2013.01); *G06F 3/1462* (2013.01); *H04N 5/23235* (2013.01);
(Continued)

(58) Field of Classification Search
CPC ............. H04N 7/0117; H04N 5/23235; H04N 5/232933; H04N 5/91; H04N 7/0806;
(Continued)

(56) References Cited

U.S. PATENT DOCUMENTS

| 7,844,611 B2 * | 11/2010 | Miyajima | ............... G06F 16/58 |
| | | | 707/758 |
| 2021/0313069 A1 * | 10/2021 | Williams | ............. A61B 5/0022 |

FOREIGN PATENT DOCUMENTS

JP        2014067096 A   *   4/2014  ............. G06F 13/00

OTHER PUBLICATIONS

"Discover Wi-Fi Miracast", Discover Page at www.wi-fi.org/discover-wi-fi/miracast; Unknown publication date but prior to filing of present application.

(Continued)

*Primary Examiner* — Nhan T Tran
(74) *Attorney, Agent, or Firm* — Philip H. Burrus, IV

(57) ABSTRACT

A method in an electronic device includes detecting, by one or more processors from a first video stream captured by an imager, one or more images being presented by a remote display of an external electronic device. The method includes receiving, with a communication device operable with the one or more processors in response to the detecting, a second video stream comprising the one or more images being presented on the remote display. The method includes replacing, by the one or more processors on a local display of the electronic device, presentation of the first video stream with the second video stream. This works to eliminate visual distortion due to differences between the refresh rates of the display and remote display or asynchronous nature of the clocks in the electronic device and the external electronic device.

20 Claims, 8 Drawing Sheets

(51) Int. Cl.
*H04N 5/232* (2006.01)
*H04N 7/12* (2006.01)
*H04N 5/91* (2006.01)
*G06F 3/14* (2006.01)

(52) U.S. Cl.
CPC ......... *H04N 5/232933* (2018.08); *H04N 5/91* (2013.01); *H04N 7/0806* (2013.01); *H04N 7/12* (2013.01)

(58) Field of Classification Search
CPC ................ H04N 7/12; H04N 21/4122; H04N 21/43637; H04N 21/44008; H04N 5/772; H04N 21/41407; H04N 21/4223; H04N 21/44227; H04N 21/8126; H04N 21/4126; H04N 21/440218; H04N 21/440263; G06F 3/1462; G06F 3/04845; G06F 3/1454; G06F 2203/04806; G09G 2354/00

See application file for complete search history.

(56) References Cited

OTHER PUBLICATIONS

"Wi-Fi Certified Miracase: Your Content—Now Showing on Screens Everywhere", YouTube; Published Sep. 18, 2012; https://www.youtube.com/watch?v=6F_wyyZg5sl&feature=youtu.be.

Bharathi, D.A. et al., "High-Security Data Hiding in Videos Using Multi-Frame, Image Cropping, and LSB Algorithm", International Journal of Advance Research, Ideas and Innovations in Technology; vol. 3, Issue3; www.IJARIIT.com; Published 2017.

Xie, Kun et al., "Real-Time Streaming Communication with Optical Codes", IEEE Access; Published Jan. 4, 2016; https://ieeexplore.ieee.org/stamp/stamp.jsp?arnumber=7370891.

\* cited by examiner

ELECTRONIC DEVICES AND CORRESPONDING METHODS FOR CAPTURING IMAGES FROM AN EXTERNAL DISPLAY OF A REMOTE ELECTRONIC DEVICE

CROSS REFERENCE TO PRIOR APPLICATIONS

This application claims priority and benefit under 35 U.S.C. § 119 from Chinese Patent Application No. 202010190028.1, filed Mar. 18, 2020, which is incorporated by reference by rule in accordance with 37 CFR § 1.57.

BACKGROUND

Technical Field

This disclosure relates generally to electronic devices, and more particularly to electronic devices having image capture devices.

Background Art

The use of portable electronic devices, such as smartphones and tablet computers, has become ubiquitous. With increasing computational power, the owners of such devices use the same not only to communicate with others, but also to manage financial accounts, track health information, manage calendaring and address book data, watch television shows and movies, interact with social media sites, engage in on-line commerce, and to surf the web.

Most all of these electronic devices include some form of imager, which may include one or more cameras. As the quality of these cameras has improved, people are increasingly using the imagers in smartphones and tablet computers as their primary image capture device, eschewing traditional stand-alone image capture devices such as single-lens-reflex cameras. It would be advantageous to have methods and systems to make the image capture devices of portable electronic devices perform even more optimally so as to increase the quality of captured images.

Figure 1:
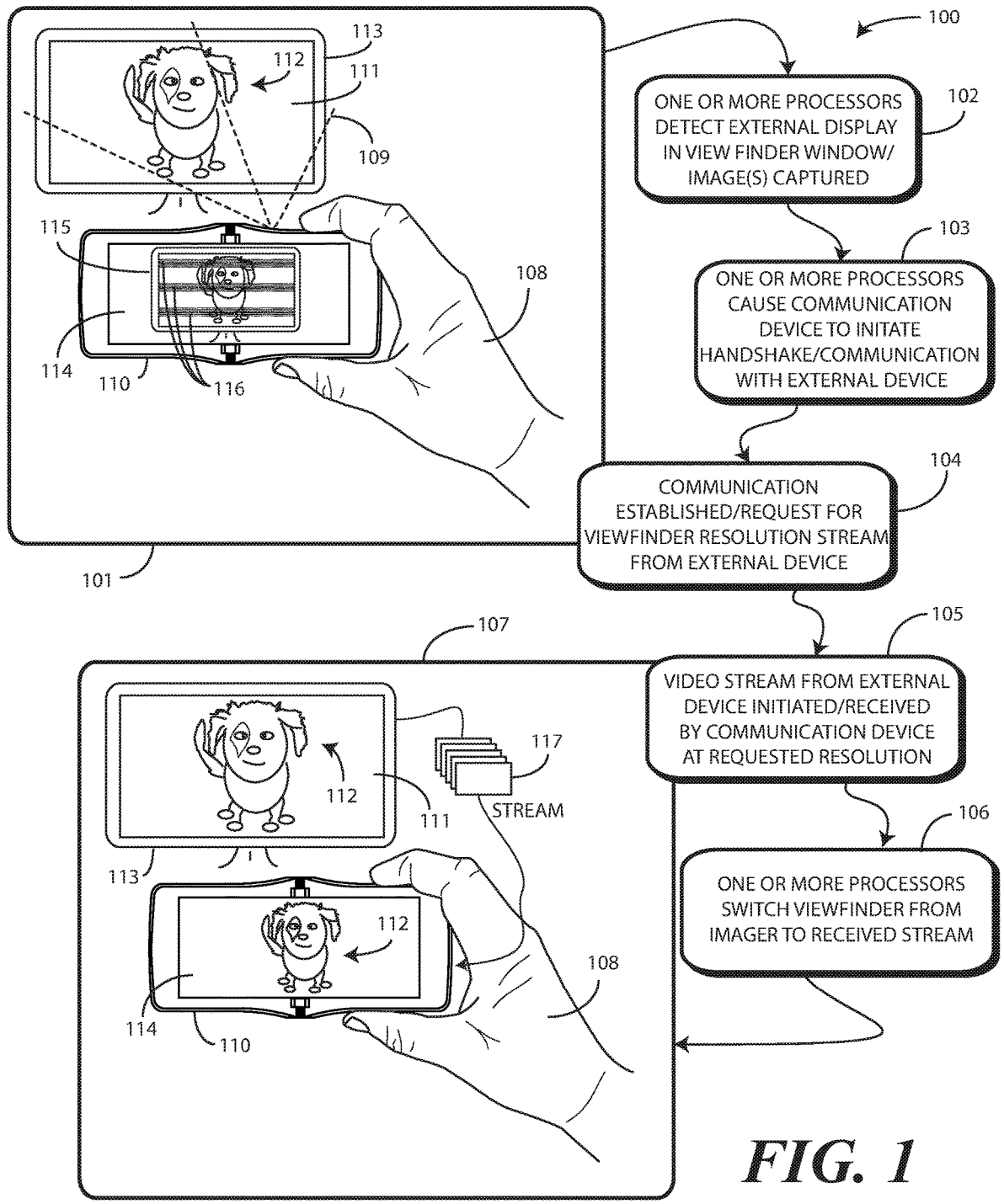
FIG. 1 illustrates one or more explanatory method steps in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting one or more images being presented on a remote display of an external electronic device and causing the transmission of a video stream comprising the one or more images to an electronic device for better image quality. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting, from a first video stream captured by an imager, one or more images being presented on a remote display of an external electronic device, receiving a second video stream comprising the one or more images being presented on the remote display, and then replacing a presentation of the first video stream with the second video stream as described herein. The non-processor circuits may include, but are not limited to, a radio receiver, a radio transmitter, signal drivers, clock circuits, power source circuits, and user input devices. As such, these functions may be interpreted as steps of a method to perform replacement of a first video stream, which is from an imager capturing images being presented on a remote display of an external electronic device, with a second video stream received from the external electronic device and containing the actual images being presented on the remote display.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Figure 7:
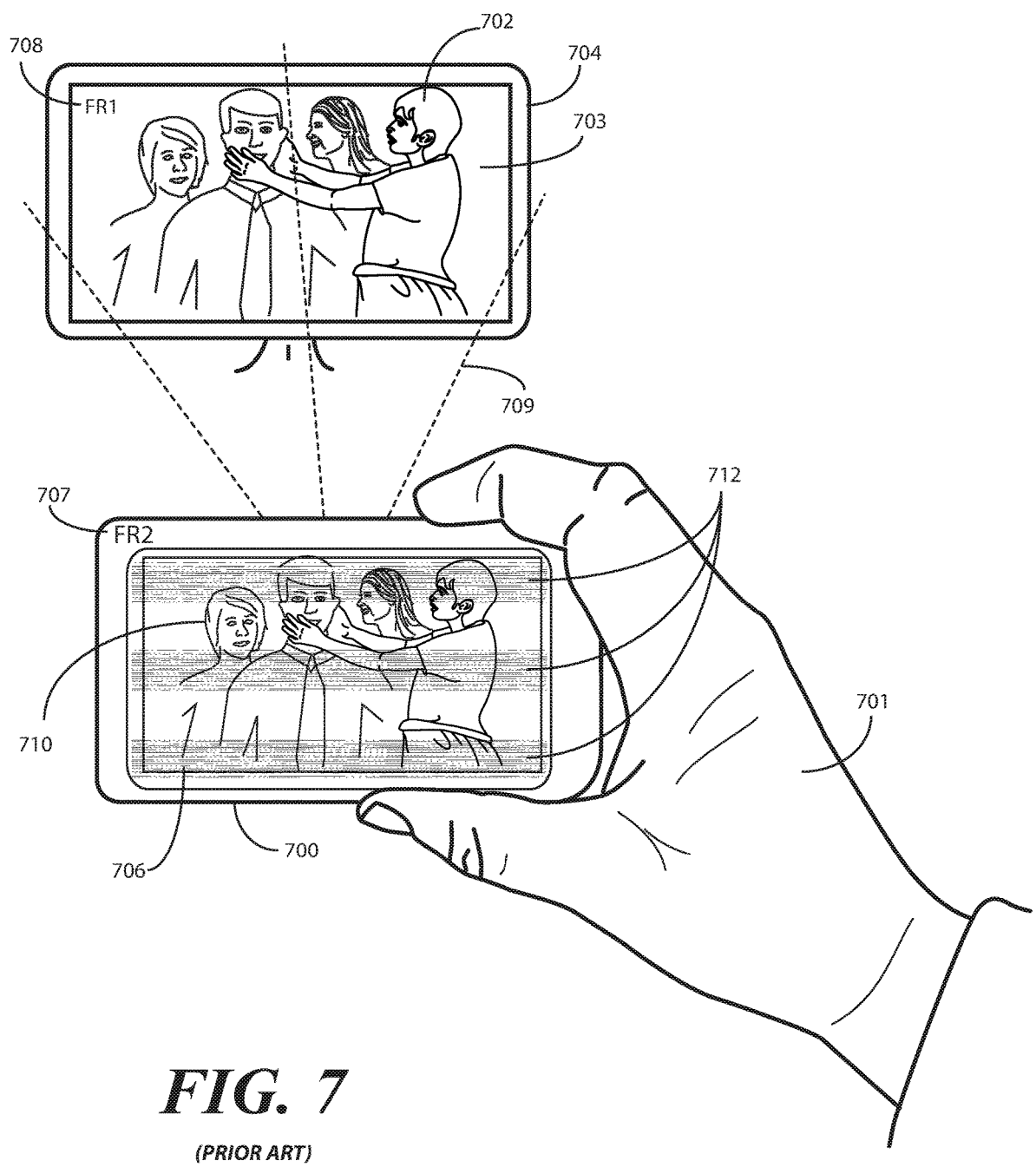
FIG. 7 illustrates a prior art electronic device capturing images being presented on a remote display of an external electronic device.

Turning initially to FIG. 7, illustrated therein is a person 701 using an imager of a prior art electronic device 700 to capture 709 a video stream 710 that includes one or more images 702 being presented on a remote display 703 of an external electronic device 704. The video stream 710 is being presented on the display 706 of the prior art electronic device 700.

As shown in FIG. 7, the display 706 of the prior art electronic device 700 has a refresh rate 707. Similarly, the remote display 703 of the external electronic device 704 also has a refresh rate 708. The refresh rate 707 of the display of the prior art electronic device 700 and the refresh rate 708 of the remote display 703 of the external electronic device 704 can be the same or different. When they are different, visible artifacts of the difference in refresh rates will be introduced as visual distortion 712 upon the display 706 of the prior art electronic device 700. Even where the refresh rate 707 of the display of the prior art electronic device 700 and the refresh rate 708 of the remote display 703 of the external electronic device 704 are the same, since the clocks within the prior art electronic device 700 and the external electronic device 704 upon which the refresh rate 707 of the display of the prior art electronic device 700 and the refresh rate 708 of the remote display 703 of the external electronic device 704 are based are unsynchronized the visual distortion 712 will still appear on the display 706 of the prior art electronic device 700.

Advantageously, embodiments of the disclosure solve this problem. In one or more embodiments, when a person using an electronic device configured in accordance with one or more embodiments of the disclosure directs its image capture device toward a remote display of an external electronic device with the imager being active and the viewfinder of the imager being presented on the display of the electronic device, one or more processors of the electronic device automatically detect that one or more images being presented on the remote display of the external electronic device are present on the video stream from the imager being presented on the display. When this occurs, in one or more embodiments the one or more processors cause a communication device of the electronic device to establish electronic communication with the external electronic device.

Thereafter, in one or more embodiments the one or more processors of the electronic device cause the communication device to transmit a request for another video stream comprising the one or more images that are being presented on the remote display of the external electronic device. In one or more embodiments, this causes the external electronic device to transmit the second video stream from the external electronic device in response to the request. Accordingly, the external electronic device starts sending the actual images being presented on the remote display of the external electronic device. The electronic device receives the images directly, rather than relying upon its imager to capture them.

In one or more embodiments, the one or more processors of the electronic device then present the video stream received from the external electronic device on the display of the electronic device, rather than the video stream being captured by the imager. In effect, the one or more processors "swap" the imager captured video stream comprising the one or more images being presented on the remote display of the external electronic device, which may include frame rate or refresh rate visual distortion, for the actual images being presented on the remote display of the external electronic device from the second video stream. Since these are the actual images being presented on the remote display of the external electronic device, no frame rate or refresh rate visual distortion is introduced. Thus, the person receives a clearer, more accurate representation of the one or more images on the local display of the electronic device.

Other advantageous operations can be performed as well. For example, in one or more embodiments when a person is simply looking at the video stream received from the external electronic device on the local display of the electronic device, the video stream received from the external electronic device can have a first resolution or first quality level. By contrast, if the person starts using an image or video capture feature to store images or video from the video stream received from the external electronic device in a memory of the electronic device, the one or more processors of the electronic device can cause the external electronic device to transmit another video stream having images with a second resolution or second quality level that is higher or greater than the first resolution or the first quality level.

Illustrating by example, imagine a person using a smartphone to capture video images from a jumbo-tron at a stadium showing a slow motion replay of the most recent touchdown. If the person is simply watching those images on the display of the smartphone, the one or more processors of the smartphone may cause an external electronic device operating the jumbo-tron to transmit a video stream with the images at a first resolution or first quality level suitable for the display of the smartphone. For instance, the first resolution may have a smaller number of pixels per inch. Alternatively, the first quality level may be that each of the images is compressed from a RAW or uncompressed format so as to have less data per images.

However, if the person starts to record the video images into the memory of the smartphone, embodiments of the disclosure contemplate that the person may want higher quality images to, for example, show the play to a friend at home at a later time on a wide-screen television. Accordingly, in one or more embodiments, when the one or more processors of the smartphone detect an initiation of a recording operation, they cause the external electronic device operable with the jumbo-tron to send a higher resolution video stream. The higher resolution video stream may include, for example, a greater number of pixels per inch. If the first resolution was, for example, 1334×750 pixels, the second resolution may be something like 2560×1440 pixels. Similarly, if the first image quality included compression of the images into MPEG-4 compression format, the second, higher image quality may comprise the images being in a RAW, raster, or other uncompressed video format, and so forth.

In still other embodiments, a user of an electronic device configured in accordance with embodiments of the disclosure can cause the image resolution or quality level to change by performing zoom operations when capturing images from a remote display of an external electronic device. Illustrating by example, imagine that the external electronic device stores a video in RAW format. Imagine that the RAW image data has a resolution that includes 100 million pixels per images. However, now imagine that the resolution of the remote display is less than this. It may have only a 1920×1080 pixel resolution. When presenting the video on the remote display of the external electronic device, the external electronic device may compress the RAW video into a format having fewer pixels per image, e.g., only the 1920×1080 resolution needed for the remote display of the external electronic device.

As described above, in one or more embodiments when a person is using the smartphone to capture and record images of the remote display of the external electronic device, the one or more processors of the smartphone may cause the external electronic device to transmit the RAW video to the smartphone in a video stream. However, embodiments allow the user to reduce the amount of data being received in the video stream by performing a zoom operation.

In one or more embodiments, if the person uses a zoom operation to cause the imager to capture only a portion of the remote display of the external electronic device, in one or more embodiments the one or more processors of the smartphone cause the external electronic device to transmit a video stream having a portion of the data from the image. Illustrating by example, if the RAW video format includes 100 million pixels per image, but the person has used the zoom feature to cause the imager of the smartphone to capture only one-fifth of the remote display of the external electronic device, in one or more embodiments the one or more processors of the smartphone cause the external electronic device to transmit only pixels corresponding to that portion being captured. Thus, the external electronic device would transmit a video stream containing 20 million pixels per image rather than the 100 million, and so forth. Other features and benefits offered by embodiments of the disclosure will be described below. Still others will be obvious to those of ordinary skill in the art having the benefit of this disclosure.

In one or more embodiments, when a user points an imager of an electronic device toward a display with the imager's viewfinder feature open, one or more processors of the electronic device automatically detect the fact that one or more images being presented on a remote display of an external electronic device appear in the video stream being captured by the imager. In one or more embodiments, the one or more processors of the electronic device cause a communication device to establish electronic communication with the external electronic device in response to detecting the one or more images appearing in the video stream captured by the imagers. For example, the one or more processors may perform a wireless handshaking operation to establish electronic communication with the external electronic device.

Initially, when the imager is capturing the video stream comprising the one or more images being presented on the remote display of the external electronic device, the one or more processors of the electronic device present this video stream on the local display of the electronic device. However, in one or more embodiments, upon establishing the electronic communication with the external electronic device, the one or more processors of the electronic device transmit a request for a second video stream comprising the one or more images being presented on the remote display of the external electronic device. In one or more embodiments, the request can include image transmission information such as resolution of images, image quality of images, baud rate, and so forth. These preferences can be set by a user using a menu in one or more embodiments.

Thereafter, the communication device of the electronic device receives the second video stream in response to the request in one or more embodiments. When this occurs, the one or more processors start presenting the second video stream comprising the one or more images rather than the first video stream on the local display of the electronic device. Said differently, in one or more embodiments the one or more processors of the electronic device switch from the "viewfinder" video stream to the video stream being received from the external electronic device.

In one or more embodiments, when the user initiates a record or save operation causing images from the video stream being received from the external electronic device to be stored in a memory of the external electronic device, the one or more processors can request a third video stream from the external electronic device that includes the one or more images in a higher resolution, higher quality, or other format that is superior to the second video stream. Thus, if the user starts saving images from the second video stream, in one or more embodiments higher, e.g., RAW format, content is transmitted from the external electronic device to the electronic device so that the saved images will be of higher quality.

Turning now to FIG. 1, illustrated therein is one explanatory method 100 in accordance with one or more embodiments of the disclosure. Beginning at step 101, a user 108 is directing the imager (located on the rear side) of an electronic device 110 toward an external electronic device 113 that includes a remote display 111. One or more images 112 are being presented on the remote display 111 of the external electronic device 113.

The external electronic device 113, shown generally as a television-type display in FIG. 1, could be any type of electronic device having a display. Examples include desktop computers, laptop computers, tablet computers, televisions, multimedia players, projection systems with projection screens, kiosks, Internet-of-Things (IoT) devices having displays, or other types of devices. Thus, it should be understood that as used herein an external electronic device 113 having a remote display 111 could be any of a number of types of devices that are configured to present still image or video content on a display, with "remote display" referring to the fact that the remote display 111 is on a device other than electronic device 110, and more particularly on a device other than the electronic device 110 such that the remote display 111 of the external electronic device 113 can situate within the field of view of an imager of the electronic device 110.

As shown at step 101, the imager is capturing 109 at least one image of the one or more images 112 being presented on the remote display 111 of the external electronic device 113. The one or more images 112 could be static content, still images, video images, scrolling images, or other types of images. In this illustrative example, the imager is capturing 109 successive images of the one or more images 112 being presented on the remote display 111 of the external electronic device 113. These successive images, which when presented in succession on a local display 114 of the electronic device 110 when the imager is in a "viewfinder" mode of operation, constitute a video stream 115. At step 101, the video stream 115 captured by the imager is being presented on the local display 114 of the electronic device 110.

As before, at step 101 the refresh rates of the remote display 111 in presenting the one or more images 112 and the local display 114 in presenting the video stream 115 may be different, and/or the clocks in the external electronic device 113 and electronic device 110 upon which the refresh rates of the remote display 111 and the local display 114 are based may be unsynchronized. Accordingly, at step 101 one or more visual artifacts resulting from one or both differences appear as visual distortion 116 in the video stream 115 that can be seen on the local display 114 of the electronic device 110.

Advantageously, embodiments of the disclosure improve the image capture process for the user 108 when using the imager of the electronic device 110 to capture the one or more images 112 being presented on the remote display 111 of the external electronic device 113 by automatically removing this visual distortion 116. In one or more embodiments, this occurs when one or more processors of the electronic device 110 replace, on the local display 114 of the electronic device 110, the video stream 115 being captured by the imager with another video stream that includes the actual images being presented on the remote display 111 of the external electronic device 113.

The process of doing this begins at step 102. In one or more embodiments, step 102 comprises the one or more processors of the electronic device 110 detecting that the one or more images 112 being presented on the remote display 111 of the external electronic device 113 appear in the video stream 115 being captured by the imager of the electronic device 110. This detection process occurring at step 102 can be a manual one or an automatic one. Illustrating by example, in one or more embodiments the user 108 may deliver user input, such as a touch, drag, or swipe with a finger, identifying at least a portion of the local display 114 as presenting the one or more images 112 from the remote display 111 of the external electronic device 113 as captured by the imager in the video stream 115 at step 102. In other embodiments, the one or more processors of the electronic device 110 can automatically detect that the one or more images 112 being presented on the remote display 111 of the external electronic device 113 are appearing in the video stream 115 so that the user 108 need not take any action or deliver any affirmative user input to do the same.

Figure 6:
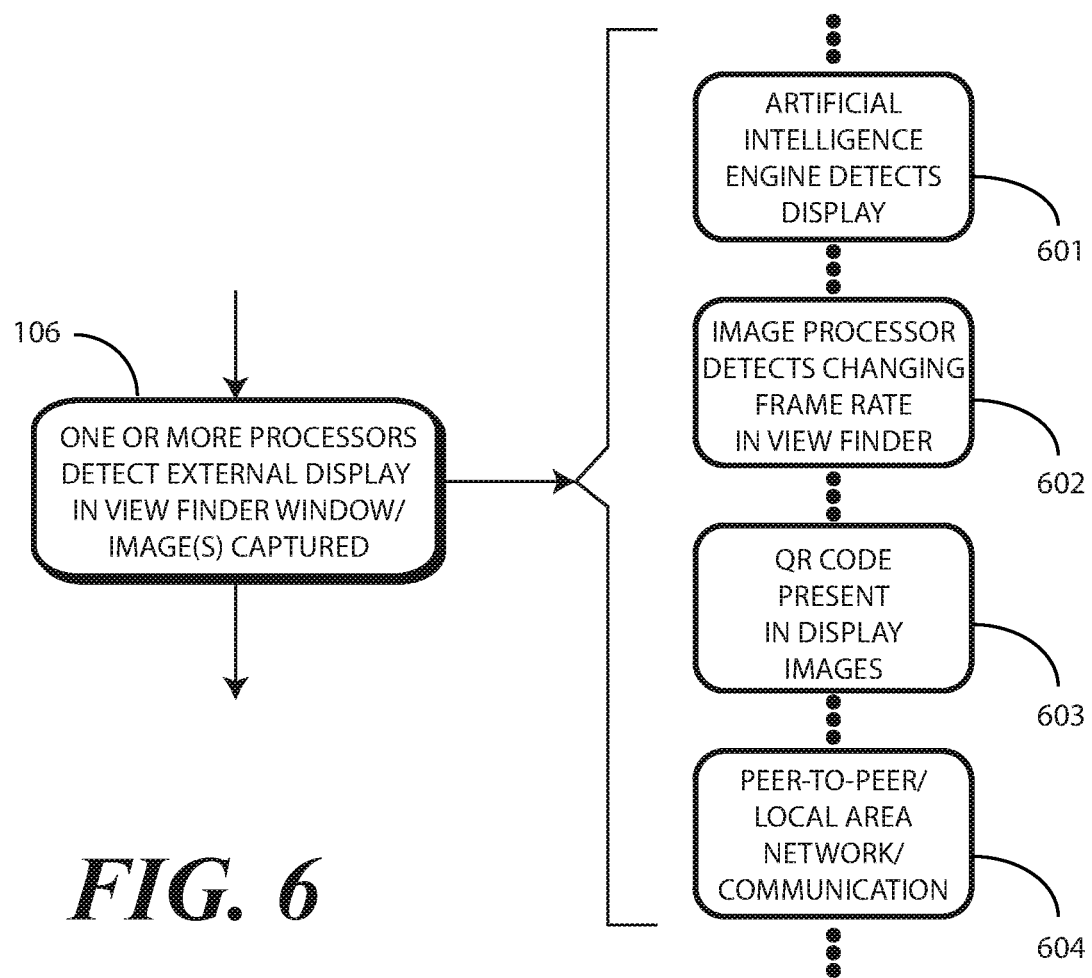
FIG. 6 illustrates method step options for detecting one or more images being presented on a remote display of an external electronic device appearing in a video stream captured by an imager of one explanatory electronic device in accordance with one or more embodiments of the disclosure.

This automatic detection by the one or more processors of the electronic device 110 at step 102 can occur in a variety of ways. Turning now briefly to FIG. 6, illustrated therein are a few of the explanatory ways the automatic detection of step 102 of FIG. 1 can occur. These examples are illustrative only, as numerous others will be obvious to those of ordinary skill in the art having the benefit of this disclosure.

In one or more embodiments, at 601 the electronic device (110) includes an artificial intelligence engine configured to detect that one or more images (112) being presented on a remote display (111) of an external electronic device (113) are appearing in a video stream (115) being captured by an imager of an electronic device (110). For example, as will be explained in more detail below with reference to FIG. 3, in one or more embodiments the electronic device (110) includes a display detection engine equipped with artificial intelligence that is operable to detect that the video stream (115), or a portion of the video stream (115), includes illumination data representing moving frames or, alternatively, includes illumination data representing the visual distortion (116) that occurs when an imager captures one or more images (112) being presented on an remote display (111) of an external electronic device (113). The display detection engine can comprise an artificial neural network or other similar technology in one or more embodiments.

Where, for example, the external electronic device (113) occupies only a portion of the images of the video stream (115), the display detection engine may detect a rectangle (or other shape corresponding to the shape of the external electronic device (113)) appearing in the images of the video stream (115), with moving frames and/or visual distortion (116) appearing inside this rectangle or other shape. Upon determining this, the display detection engine can notify the one or more processors of the electronic device (110) that one or more images (112) being presented on a remote display (111) of an external electronic device (113) are appearing in the video stream (115) being captured by the imager of the electronic device (110).

In another embodiment, at 602 an image processor can be configured to process the video stream (115) to detect one or more of a changing frame rate occurring in the video stream (115), the visual distortion (116) appearing in the video stream (115), changing lighting conditions occurring with a predefined frequency associated with display refresh rates, e.g., 60 Hz, appearing in the video stream (115), objects within a portion of the video stream (115) moving at rates that are unrelated to other portions of the video stream (115), combinations thereof, or by detecting other phenomena occurring in the video stream (115).

The image processor of 602, where included, is operable with the one or more processors of the electronic device (110) as well as the various image capture devices of the electronic device (110). In one or more embodiments the image processor of 602 can operate as an identification module configured with optical recognition to identify objects using image recognition, character recognition, visible recognition, facial recognition, color recognition, shape recognition, and the like. Advantageously, the imager processor of 602 can be used to recognize external electronic devices, remote displays of external electronic devices, images being presented on remote displays of external electronic devices, or other phenomena within still or moving video streams captured by the imager of the electronic device (110).

At 603, the one or more processors of the electronic device (110) can detect one or more images (112) being presented on a remote display (111) of an external electronic device (113) in a video stream (115) being captured by an imager of the electronic device (110) by identifying, optionally using an image processor, content or information in the video stream (115) indicating that some or all of the image data in the video stream (115) was presented on a remote display (111) of an external electronic device (113). For example, the one or more images (112) being presented on the remote display (111) of the external electronic device (113) may include a bar code, a matrix barcode (QR code), or other indicia that, when captured by the imager of the electronic device (110), can be identified by the one or more processors and/or image processor of the electronic device (110). When, in one or more embodiments, the one or more processors and/or image processor of the electronic device (110) identify a barcode, QR code, or other indicia, this allows the detection of the one or more images (112) being presented on the remote display (111) of the external electronic device (113) appearing in the video stream (115) being captured by the imager of the electronic device (110).

It should be noted that this indicia appearing in the one or more images (112) being presented on the remote display (111) of the external electronic device (113) could be visible to the user (108) or could be invisible to the user (108). If configured as a QR code, for example, the user (108) would be able to see the indicia identifying the content as that having been presented by a remote display (111) of an external electronic device (113). However, the content could be configured as infrared light, ultraviolet light, or using other techniques that make the identifier invisible to the user (108). When using the latter technique, the one or more images (112) being presented on the remote display (111) of the external electronic device (113) would look like normal images to the user (108), but would be interpreted by the one or more processors and/or image processor of the electronic device (110) as emanating from a remote display (111) of an external electronic device (113).

In still other embodiments, at 604, electronic communication between the electronic device (110) and the external electronic device (113) can be used to allow the one or more processors of the electronic device (110) to automatically detect the one or more images (112) being presented on the remote display (111) of the external electronic device (113) as appearing in the video stream (115) being captured by the imager of the electronic device (110). For example, location detectors, orientation detectors, or other sensors of the electronic device (110) may determine an orientation and direction of reference for the electronic device (110) when the imager is active. At the same time, the communication device of the electronic device (110) may receive location data from the external electronic device (113) identifying its location within the environment of the electronic device (110). The one or more processors may use this information, obtained via electronic communication between the electronic device (110) and the external electronic device (113) to automatically detect the one or more images (112) being presented on the remote display (111) of the external electronic device (113) appearing in the video stream (115) being captured by the imager of the electronic device (110). The detection of one or more images (112) being presented on a remote display (111) of an external electronic device (113) via electronic communication between the electronic device (110) and the external electronic device (113) in other ways will be obvious to those of ordinary skill in the art having the benefit of this disclosure.

As noted above, the examples of FIG. 6 regarding how one or more processors of the electronic device (110) can automatically detect the one or more images (112) being presented on the remote display (111) of the external electronic device (113) appearing in the video stream (115) being captured by the imager of the electronic device (110) are illustrative only. Numerous others will be obvious to those of ordinary skill in the art having the benefit of this disclosure.

Turning now back to FIG. 1, at step 103 the one or more processors of the electronic device 110 cause a communication device of the electronic device to establish electronic communication with the external electronic device 113 in response to the one or more processors detecting the one or more images 112 being presented on the remote display 111 of the external electronic device 113 appearing in the video stream 115. In one or more embodiments, step 103 comprises the one or more processors of the electronic device 110 causing the communication device to initiate a wireless handshake operation to establish communication with a communication device of the external electronic device 113. Other techniques for establishing electronic communication between the electronic device 110 and the external electronic device 113 will be obvious to those of ordinary skill in the art having the benefit of this disclosure.

At step 104, in response to communication between the communication device of the electronic device 110 and the communication device of the external electronic device 113 being established at step 103, in one or more embodiments the one or more processors of the electronic device 110 cause the communication device of the electronic device 110 to transmit a request for another video stream from the external electronic device 113, i.e., a second video stream that is different from the video stream 115 being captured by the imager of the electronic device 110. In one or more embodiments, the request transmitted by the communication device of the electronic device 110 at step 104 comprises a request for the second video stream to include the one or more images 112 being presented on the remote display 111 of the external electronic device 113.

In one or more embodiments, the request transmitted at step 104 can include image transmission information such as the resolution of the one or more images 112 to be included with the second video stream desired by the one or more processors of the electronic device 110, an image quality level of one or more images 112 to be included with the second video stream desired by the one or more processors of the electronic device 110, a baud or data transmission rate for the second video stream desired by the one or more processors of the electronic device 110, a compression level, type, or format for the one or more images 112 included in the second video stream as desired by the one or more processors of the electronic device 110, a file size of the one or more images 112, or other characteristics regarding how the data of the second video stream should be configured. The image transmission information included with the request transmitted at step 104 can optionally be defined by the user 108 using a settings menu available at a user interface of the electronic device 110 in one or more embodiments.

At step 105, in response to transmitting the request at step 104, the communication device of the electronic device 110 receives the second video stream from the external electronic device 113. In one or more embodiments, the second video stream comprises the one or more images 112 being presented on the remote display 111 of the external electronic device 113. Step 106 then comprises the one or more processors of the electronic device 110 then presenting the second video stream on the local display 114 of the electronic device 110.

As shown at step 107, the communication device of the electronic device 110 is receiving the second video stream 117 from the external electronic device 113. Additionally, the one or more processors of the electronic device 110 are presenting the second video stream 117 on the local display of the electronic device 110. Accordingly, the visual distortion 116 present at step 101, where the one or more processors of the electronic device 110 were presenting the first video stream 115 on the local display 114 of the electronic device 110 prior to detecting the one or more images 112 appearing in the first video stream 115 at step 102, is no longer present in the one or more images 112 when they are presented on the local display 114 of the electronic device 110 at step 107 due to the fact that they have are included in the second video stream 117 in their native form rather than being captured by the imager of the electronic device 110 in the first video stream 115.

This advantageously occurs because the one or more processors of the electronic device 110, between step 101 and step 107 via steps 102-106, have replaced displaying the first video stream 115 on the local display 114 of the electronic device 110 at step 101 with presenting the second video stream 117 on the local display 114 of the electronic device 110 at step 107. Since the one or more processors are presenting the actual one or more images 112 received in the second video stream 117 at step 107, rather than visible representations of the one or more images 112 captured by the imager in the first video stream 115 of step 101, all visual distortion 116 is advantageously eliminated. Accordingly, the method 100 of FIG. 1 improves the image quality presented on the local display 114 of the electronic device 110 at step 107 when the imager of the electronic device 110 is capturing a video stream 115 that includes images presented on a remote display 111 of an external electronic device 113.

Recall from above that in one or more embodiments, the request transmitted at step 104 can define characteristics the one or more images 112 present in the second video stream 117 should include. These include the resolution of the one or more images 112 included with the second video stream 117, the image quality level of the one or more images 112 included with the second video stream 117, a baud or data transmission rate for the second video stream 117, a file size for the one or more images 112 present in the second video stream 117, a compression level, type, or format for the one or more images 112 included in the second video stream 117, a file data size for the one or more images 112, or other characteristics relating to the data transmission rate, data size, or image quality of the second video stream 117.

In one or more embodiments, the one or more images 112 being received in the second video stream 117 at step 107 have one or more of a first resolution and/or first image quality level. Embodiments of the disclosure contemplate that when the user 108 is viewing the one or more images 112 extracted from the second video stream 117 on the local display 114 of the electronic device 110, which may only be a few inches in diameter if the electronic device 110 is a smartphone, a lower image quality will be perfectly sufficient than, for example, if the user 108 were employing a projector of the electronic device 110 to project the one or more images 112 extracted from the second video stream 117 along a wall or other projection surface. Accordingly, in one or more embodiments where the request transmitted at step 104 specifies a first image quality level for the one or more images 112 of the second video stream 117, or when the external electronic device 113 defaults to initially sending the second video stream 117 with a first image quality level, step 107 comprises the communication device of the electronic device 110 receiving the one or more images 112 in the second video stream 117 with that specified—or default—image quality level. By contrast, if the user 108 starts using an image or video capture feature to store images or video from the second video stream 117 received from the external electronic device 113 in a memory of the electronic device 110, as will be described below with reference to FIG. 2, the one or more processors of the electronic device 110 can transmit another request to the external electronic device 113 asking it to transmit a third video stream having images with a second resolution or second quality level that is higher or greater than the first resolution or the first quality level associated with the second video stream 117.

Figure 2:
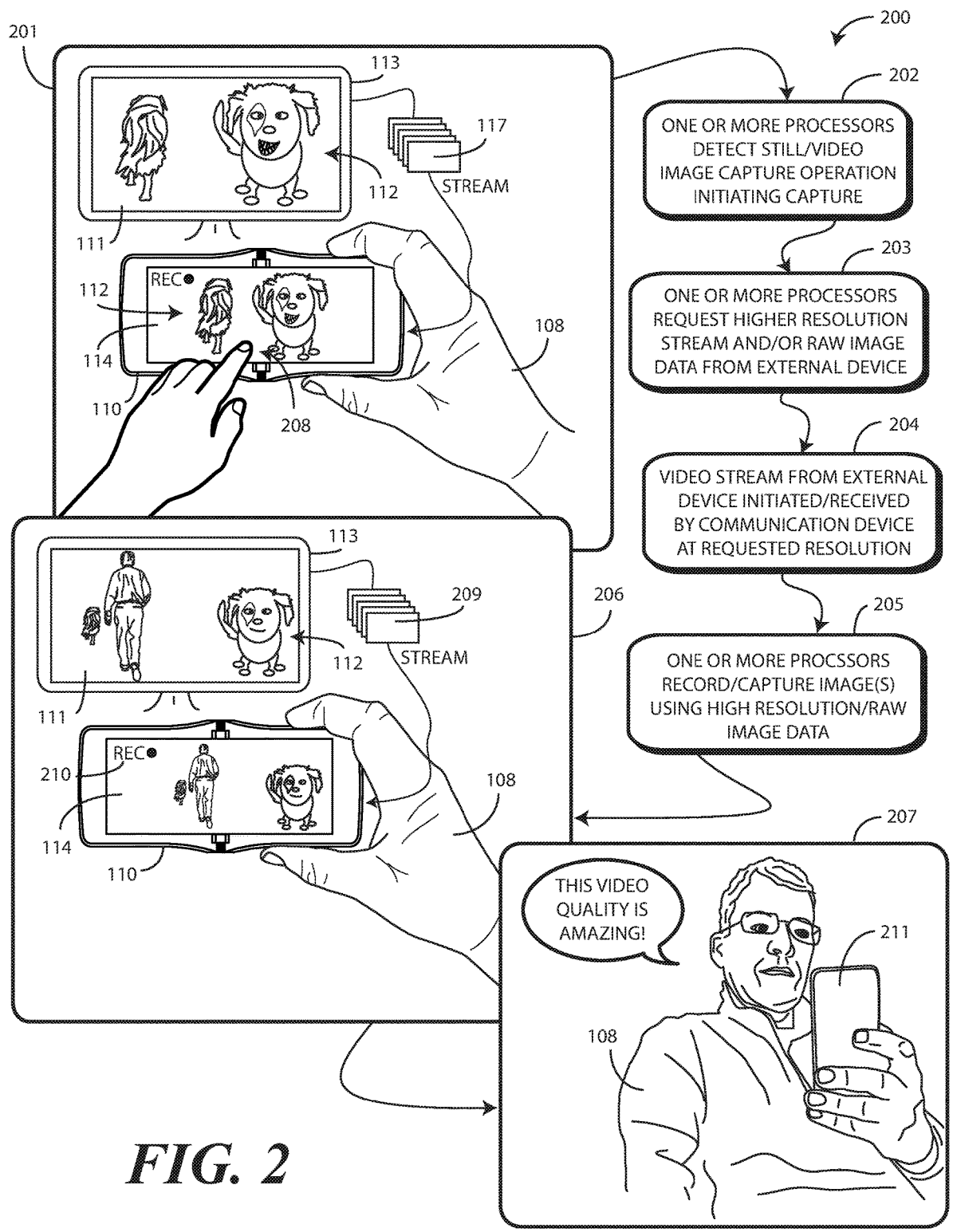
FIG. 2 illustrates one or more other explanatory method steps in accordance with one or more embodiments of the disclosure.

Illustrating by example, turning now to FIG. 2, illustrated therein is another method 200 in accordance with one or more embodiments of the disclosure. At step 201, the one or more processors of the electronic device 110 have replaced, on the local display 114 of the electronic device 110, the first video stream (115) comprising the one or more images 112 being presented on the remote display 111 of the external electronic device 113 with the second video stream 117 being received from the external electronic device 113 and comprising the one or more images 112. Accordingly, no visual distortion (116) is present when the one or more images 112 are presented on the local display 114 of the electronic device 110. As noted above, since the first request transmitted to the external electronic device 113 at step (104) specified a first image quality level for the one or more images 112 of the second video stream 117, the one or more images 112 included with the second video stream 117 are delivered at the first image quality level.

The first image quality level can refer to a resolution, data file size, compression level, compression format, or other factors that impact the visual quality of the one or more images 112 when rendered on the local display 114 of the electronic device 110. In one or more embodiments, since the user 108 is viewing the one or more images 112 from the second video stream 117 on a small display of the electronic device 110, the first quality level comprises a first image resolution level for the one or more images 112 of the second video stream 117, where that first image resolution level corresponds to an image resolution presentation capability of the local display 114 of the electronic device 110.

Effectively, since the local display 114 of the electronic device 110 is a smartphone display in this example having a diagonal dimension of only a few inches, efficiencies in transmitting and receiving the second video stream 117 can be obtained by sending the one or more images 112 in the second video stream 117 with the necessary image resolution to produce high quality images on a small display, without the necessity of sending data files that could also present the one or more images 112 of the second video stream 117 on, say, a monitor with a diagonal dimension of over sixty inches. The first image quality level for the one or more images 112 of the second video stream 117 may have a smaller number of pixels per inch, for example, in one or more embodiments. Alternatively, the first quality level for the one or more images 112 of the second video stream 117 may be that each of the images is compressed from a RAW or uncompressed format so as to have less data per images in another embodiment. Other examples of definitions for the first image quality level will be obvious to those of ordinary skill in the art having the benefit of this disclosure.

At step 201, the user 108 delivers user input 208 to the local display 114 of the electronic device 110, which is touch sensitive and serves as a primary user interface of the electronic device 110. In this illustration, the user input 208 causes a recording operation that initiates recording or storage of at least one image of the one or more images 112 of the second video stream 117 into a memory of the electronic device 110. At step 202, the one or more processors of the electronic device 110 receive, from the user interface defined by the local display 114 of the electronic device 110, this user input causing the storage of at least one image of the one or more images 112 from the second video stream 117 into the memory of the electronic device 110, or alternatively cloud storage or another storage device external to the electronic device 110.

In response to detecting this "recording" operation being initiated, in one or more embodiments step 203 comprises the one or more processors of the electronic device 110 transmitting a second request for a third video stream from the external electronic device 113 comprising the one or more images 112. Since a recording operation has been initiated, this second request transmitted at step 203 specifies a second image quality level for the third video stream that is a higher image quality level than the first image quality level of the second video stream 117 being transmitted before the recording operation was initiated by the user input 208 at step 201.

If, for example, the first image quality level associated with the second video stream 117 was a predefined number of pixels per inch, the second image quality level specified for the third video stream may have a higher number of pixels per inch. If the first image quality level for the second video stream 117 was, for instance, a first resolution of 1334×750 pixels, image quality level for the third video stream may have a higher resolution, such as something like 2560×1440 pixels. Similarly, if the first image quality level associated with the second video stream 117 a compression of the one or more images 112 in a MPEG-4 compression format, the second quality level associated with the third video stream may comprise the one or more images 112 being in a RAW, raster, or other uncompressed video format, and so forth.

At step 205, the communication device of the electronic device 110 begins receiving the third video stream from the external electronic device 113. As shown at step 206, the communication device of the electronic device 110 is receiving the third video stream 209, with hits second, higher image quality level, from the external electronic device 113. Additionally, the one or more processors of the electronic device 110 are presenting the third video stream 209 on the local display 114 of the electronic device 110 due to the fact that a recording operation 210 is occurring at the electronic device 110. While the visual resolution to the user 108 is effectively the same at step 206 due to the fact that the image resolution presentation capability of the local display 114 of the electronic device 110 has not changed, the images being recorded into the memory of the electronic device 110 (or cloud storage or other external storage device) are being saved at the higher image quality level.

Thus, when the user 108 views the one or more images 112 on a device having a higher image resolution presentation capability, such as the tablet computer 211 of step 207, they can be presented with a resolution suitable for this resolution presentation capability due to the fact that they were recorded with the higher image quality level. As shown at step 207, the user 108 thinks the quality of the images is incredible, despite the fact that he perceived the one or more images 112 as being merely by the imager of the electronic device 110 with the smaller display. In effect, the automatic background steps have brought true high-definition image resolution without any visual distortion (116) in response to the user 108 simply actuating the imager and directing its field of view toward the remote display 111 of the external electronic device 113.

Thus, using the method 200 of FIG. 2, if the user is simply watching the one or more images 112 from the second video stream 117 on the local display 114 of the electronic device 110, the one or more processors of the electronic device 110 cause the external electronic device 113 to transmit the second video stream 117 with the one or more images 112 included therein at a first resolution or first quality level suitable for the local display 114 of the electronic device 110. However, if the user 108 starts to record the video images into the memory of the electronic device 110 or elsewhere using the user interface of the electronic device 110, embodiments of the disclosure contemplate that the user 108 may want higher quality images to, for example, view on another electronic device having a higher image resolution presentation capability, such as the tablet computer 211 of step 207. Accordingly, in one or more embodiments when the one or more processors of the electronic device 110 detect, at step 202, an initiation of a recording operation, they cause the external electronic device 113 to send a higher resolution video stream, e.g., the third video stream 209 with its higher image quality level.

Figure 3:
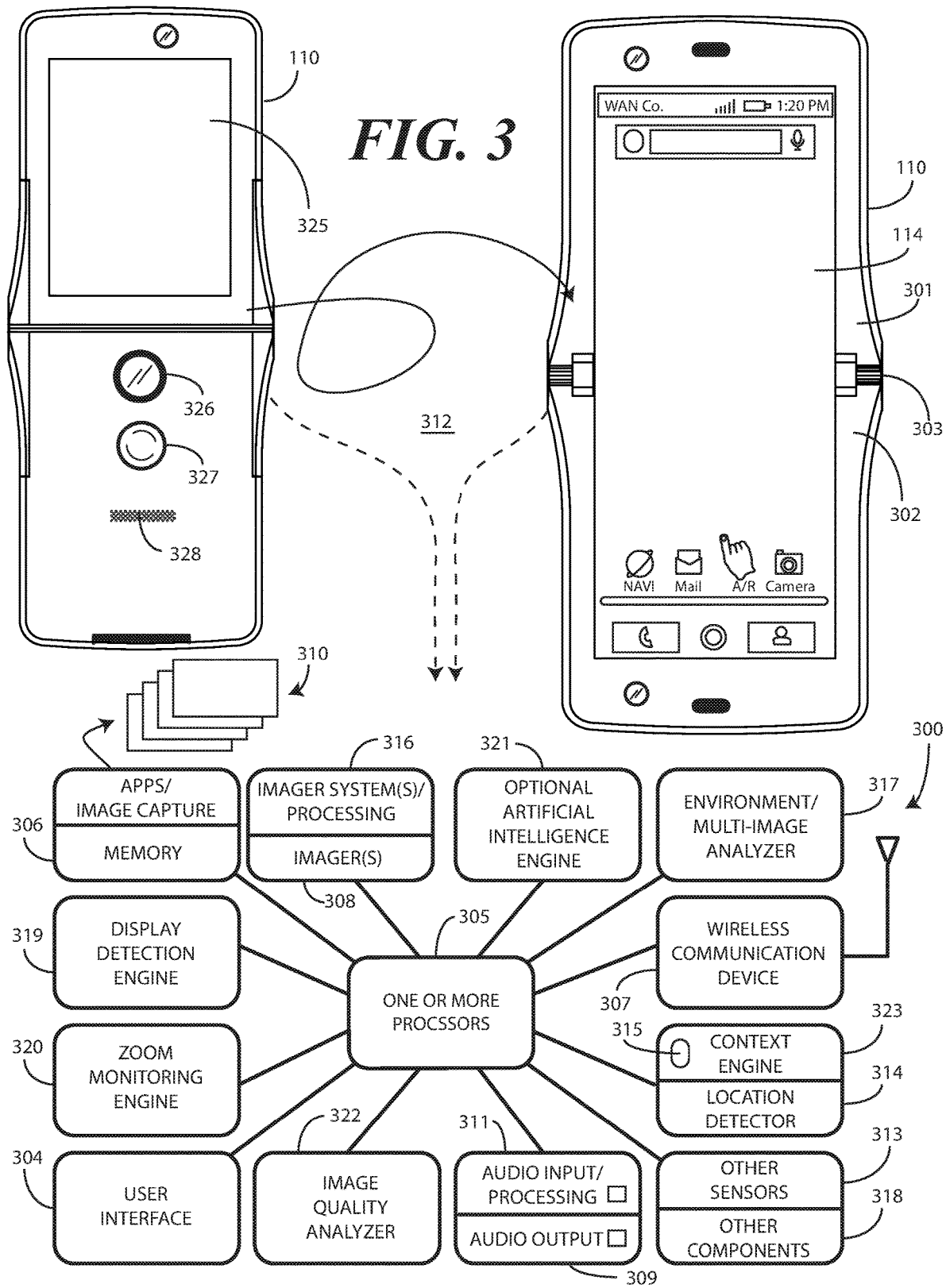
FIG. 3 illustrates one explanatory electronic device in accordance with one or more embodiments of the disclosure.

Turning now to FIG. 3, illustrated therein are more details of one explanatory electronic device 110 configured in accordance with one or more embodiments of the disclosure. While illustrated as a hinged electronic device, the electronic device 110 could include a singular housing that is not deformable and has no hinge, configured in a traditional "candy bar" form factor as well. Where configured as a candy bar, the display 114 of electronic device 110 would remain exposed and accessible. By contrast, where configured as a hinged device having a first device housing 301 that is selectively pivotable about a hinge 303 relative to the second device housing 302 between a closed position and an axially displaced open position, the display 114 of the electronic device 110 can be selectively concealed and revealed, depending upon whether the electronic device is in the closed position or the axially displaced open position.

The electronic device 110 of FIG. 3 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 110 of FIG. 3 includes multiple displays 114,325. A secondary display 325, which can be coupled to either of the first device housing 301 or the second device housing 302, is coupled to the first device housing 301 in this embodiment. This display 325 is considered to be an "exterior" display due to the fact that it is exposed when the first device housing 301 and the second device housing 302 are in the closed position.

The primary display, i.e., display 114, can also be coupled to either or both of the first device housing 301 or the second device housing 302. In this illustrative embodiment, the display 114 is coupled to both the first device housing 301 and the second device housing 302 and spans the hinge 303. In other embodiments, this display 114 can be replaced by two displays, with one coupled to the first device housing 301 and another coupled to the second device housing 302. In either case, this display 114 is considered to be an "interior" display because it is concealed when the first device housing 301 and the second device housing 302 are in the closed position. Either or both of display 114 or display 325 can be touch-sensitive.

Features can be incorporated into the first device housing 301 and/or the second device housing 302. Examples of such features include an optional camera 326, which was used as the imager in the methods (100,200) of FIGS. 1-2, or an optional speaker port 327. Each is shown disposed on the rear side of the electronic device 110 in FIG. 3, but imagers could be placed on the front side instead of, or in addition to, camera 321 as well. In this illustrative embodiment, an optional user interface component 328, which may be a button or touch sensitive surface, can also be disposed along the rear side of the second device housing 302.

Also illustrated in FIG. 3 is one explanatory block diagram schematic 300 of one or more components suitable for inclusion the electronic device 110. In one or more embodiments, the block diagram schematic 300 is configured as a printed circuit board assembly disposed within the first device housing 301 and/or second device housing 302 of electronic device 110. Various components can be electrically coupled together by conductors or a bus disposed along one or more printed circuit boards. It should be noted that the block diagram schematic 300 includes many components that are optional, but which are included in an effort to demonstrate how varied electronic devices configured in accordance with embodiments of the disclosure can be.

Thus, it is to be understood that the block diagram schematic 300 of FIG. 3 is provided for illustrative purposes only and for illustrating components of one electronic device 110 in accordance with embodiments of the disclosure. The block diagram schematic 300 of FIG. 3 is not intended to be a complete schematic diagram of the various components required for an electronic device 110. Therefore, other electronic devices in accordance with embodiments of the disclosure may include various other components not shown in FIG. 3, or may include a combination of two or more components or a division of a particular component into two or more separate components, and still be within the scope of the present disclosure.

The illustrative block diagram schematic 300 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 300 includes a user interface 304. In one or more embodiments, the user interface 304 includes the display 114, which may optionally be touch-sensitive. In one embodiment, users can deliver user input to the display 114 by delivering touch input from a finger, stylus, or other objects disposed proximately with the display 114. For electronic device 110, since the display 114 spans the hinge 303, it is configured to be flexible. For instance, in one embodiment this display 114 is configured as an organic light emitting diode (OLED) display fabricated on a flexible plastic substrate. This allows the display 114 to be flexible so as to deform when the first device housing 301 pivots about the hinge 303 relative to the second device housing 302. However, it should be noted that other types of displays would be obvious to those of ordinary skill in the art having the benefit of this disclosure. In other embodiments conventional, rigid displays can be disposed to either side of the hinge 303 rather than using a flexible display.

In one embodiment, the display 114 is configured as an active matrix organic light emitting diode (AMOLED) display. However, it should be noted that other types of displays, including liquid crystal displays, would be obvious to those of ordinary skill in the art having the benefit of this disclosure.

In one embodiment, the electronic device 110 includes one or more processors 305. In one embodiment, the one or more processors 305 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 300. Each of the application processor and the auxiliary processor(s) can be configured to process and execute executable software code to perform the various functions of the electronic device 110 with which the block diagram schematic 300 operates. A storage device, such as memory 306, can optionally store the executable software code used by the one or more processors 305 during operation.

In this illustrative embodiment, the block diagram schematic 300 also includes a communication device 307 that can be configured for wired or wireless communication with one or more other devices or networks. The networks can include a wide area network, a local area network, and/or personal area network. The communication device 307 may also utilize wireless technology for communication, such as, but are not limited to, peer-to-peer or ad hoc communications such as HomeRF, Bluetooth and IEEE 802.11, and other forms of wireless communication such as infrared technology. The communication device 307 can include wireless communication circuitry, one of a receiver, a transmitter, or transceiver, and one or more antennas.

In one embodiment, the one or more processors 305 can be responsible for performing the primary functions of the electronic device with which the block diagram schematic 300 is operational. For example, in one embodiment the one or more processors 305 comprise one or more circuits operable with the user interface 304 to present presentation information to a user. This information can include video streams captured by one or more imagers 308 of the electronic device 110 and/or one or more video streams received from external electronic devices. Additionally, the one or more processors 305 can be operable with an audio output device 309 to deliver audio output to a user. The executable software code used by the one or more processors 305 can be configured as one or more modules 310 that are operable with the one or more processors 305. Such modules 310 can store instructions, control algorithms, and so forth.

In one or more embodiments, the block diagram schematic 300 includes an audio input/processor 311. The audio input/processor 311 can include hardware, executable code, and speech monitor executable code in one embodiment.

The audio input/processor 311 can include, stored in memory 306, basic speech models, trained speech models, or other modules that are used by the audio input/processor 311 to receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models to identify speech commands in one or more embodiments.

The audio input/processor 311 is operable as an audio capture device to receive and capture audio input from a source, such as a person, authorized user, plurality of persons within an environment 312 about the electronic device 110. The audio input/processor 311 can include hardware, executable code, and speech monitor executable code in one embodiment. The audio input/processor 311 can be operable with one or more predefined authentication references stored in memory 306. In one or more embodiments, the audio input/processor 311 can receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models stored with the predefined authentication references to identify speech commands.

In one embodiment, the audio input/processor 311 is configured to implement a voice control feature that allows the electronic device 110 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 305 of the electronic device 110 to execute a control operation.

Various sensors 313 can be operable with the one or more processors 305. A first example of a sensor that can be included with the various sensors 313 is a touch sensor. The touch sensor can include a capacitive touch sensor, an infrared touch sensor, resistive touch sensors, or another touch-sensitive technology.

Another example of a sensor 313 is a geo-locator that serves as a location detector 314. In one embodiment, location detector 314 is able to determine location data of the electronic device 110. Location can be determined by capturing the location data from a constellation of one or more earth orbiting satellites, or from a network of terrestrial base stations to determine an approximate location. The location detector 314 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 315 that determines an orientation and/or movement of the electronic device 110 in three-dimensional space. Illustrating by example, the orientation detector 315 can include an accelerometer, gyroscopes, or other device to detect device orientation and/or motion of the electronic device 110. Using an accelerometer as an example, an accelerometer can be included to detect motion of the electronic device. Additionally, the accelerometer can be used to sense some of the gestures of the user, such as one talking with their hands, running, or walking.

The orientation detector 315 can determine the spatial orientation of an electronic device 110 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 110.

The orientation detector 315 can also be used as a motion detector. Illustrating by example, an accelerometer, gyroscopes, or other device can be used as a motion detector in an electronic device 110. Using an accelerometer as an example, an accelerometer can be included to detect motion of the electronic device. Additionally, the accelerometer can be used to sense some of the gestures of the user, such as one talking with their hands, running, or walking.

The motion detector can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a sensor 313 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

An image processing system 316 can be included in the electronic device 110 and can be operable with the one or more processors 305. The image processing system 316 can be operable with one or more imagers 308. The one or more imagers can comprise one or more of a conventional imager, such as camera 326, a depth imager, and, optionally, one or more proximity sensors.

In one embodiment, the one or more imagers 308 comprise a two-dimensional imager, such as that illustrated by camera 326. In one or more embodiments, the camera 326 comprises a two-dimensional Red-Green-Blue (RGB) imager. The one or more imagers 308 can also include an infrared imager, such as for identifying invisible indications of images being presented on remote displays of external electronic devices as described above with reference to element (603) of FIG. 6. Other types of imagers suitable for inclusion with the one or more imagers 308 will be obvious to those of ordinary skill in the art having the benefit of this disclosure.

Where a depth imager is included with the one or more imagers 308, the depth imager can take a variety of forms. In a first embodiment, the depth imager comprises a pair of imagers separated by a predetermined distance, such as three to four images. This "stereo" imager works in the same way the human eyes do in that it captures images from two different angles and reconciles the two to determine distance. In another embodiment, the depth imager employs a structured light laser. The structured light laser projects tiny light patterns that expand with distance. These patterns land on a surface and are then captured by an imager. By determining the location and spacing between the elements of the pattern, three-dimensional mapping can be obtained. In still another embodiment, the depth imager comprises a time of flight device. Time of flight three-dimensional sensors emit laser or infrared pulses from a photodiode array. These pulses reflect back from a surface. The time it takes for pulses to move from the photodiode array to the surface and back determines distance, from which a three-dimensional mapping of a surface can be obtained. Regardless of embodiment, where included the depth imager adds a third "z-dimension" to the x-dimension and y-dimension defining the two-dimensional image captured by the two dimensional imagers such as camera 326.

In one or more embodiments, the image processing system 316 can be operable with an environmental analyzer 317. The environmental analyzer 317 can be configured to process an image or depth scan of an object and determine whether the object matches predetermined criteria by comparing the image or depth scan to one or more predefined authentication references stored in memory 306. Working in conjunction with the environmental analyzer 317, in one or more embodiments the image processing system 316 can be configured to identify one or both of external electronic devices within a field of view of the one or more imagers 308 and/or one or more images being presented on a remote display of an external electronic device when captured in a video stream by the one or more imagers 308. Beneficially, this optical recognition performed by the image processing system 316 operating in conjunction with the environmental analyzer 317 allows access to the electronic device 110 to perform the operations of element (602) described above with reference to FIG. 6.

Other components 318 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 318 can also include a mechanical output component such as vibrating or motion-based mechanisms.

The other components 318 can optionally include a barometer operable to sense changes in air pressure due to elevation changes or differing pressures of the electronic device 110. The other components 318 can also optionally include a light sensor that detects changes in optical intensity, color, light, or shadow in video streams captured by the one or more imagers 308 to detect one or more images being presented on a remote display of an external electronic device in the video stream in one or more embodiments.

In one or more embodiments, the one or more processors 305 can define one or more process engines. Examples of these process engines include a display detection engine 319, a zoom monitoring engine 320, an artificial intelligence engine 321, an image quality analyzer 322, and a context engine 323. Each engine can be a component of the one or more processors 305, operable with the one or more processors 305, defined by the one or more processors 305, and/or integrated into the one or more processors 305. Other configurations for these engines, including as software or firmware modules operable on the one or more processors 305, will be obvious to those of ordinary skill in the art having the benefit of this disclosure.

For instance, a context engine 323 can be operable with the various sensors to detect, infer, capture, and otherwise detect external electronic devices that have displays presenting one or more images within an environment about the electronic device 110. For example, where included one embodiment of the context engine 323 determines assessed contexts and frameworks using adjustable algorithms of context assessment employing information, data, and events. These assessments may be learned through repetitive data analysis. Alternatively, a user may employ the user interface 304 to enter various parameters, constructs, rules, and/or paradigms that instruct or otherwise guide the context engine 323 in detecting when the one or more imagers 308 are capturing one or more images being presented on an remote display of an external electronic device and other contextual information. The context engine 323 can comprise an artificial neural network or other similar technology in one or more embodiments.

The display detection engine 319 can be configured to detect, in conjunction with the one or more processors 305 of the electronic device 110, when the one or more imagers 308 are capturing a video stream containing one or more images being presented on a remote display of an external electronic device. The display detection engine 319 can optionally operate in conjunction with the artificial intelligence engine 321 to perform the automatic detection described above with reference to element (601) of FIG. 6. Alternatively, the display detection engine 319 can operate in conjunction with the image processing system 316 to perform the automatic detection described above with reference to elements (602,603) of FIG. 6.

The zoom monitoring engine 320 can be used to perform one or more of the method steps described below with reference to FIGS. 4 and 5. For example, the zoom monitoring engine 320 can be used to receive, from the user interface 304 of the electronic device 110, user input causing only a portion of images being captured by the one or more imagers 308 and/or received by the communication device 307 from an external electronic device to be presented on the display 114 of the electronic device 110.

Additionally, the zoom monitoring engine 320 can be operable to identify a location of the portion and/or size of the portion of the images being captured by the one or more imagers 308 and/or received by the communication device 307 from an external electronic device being presented on the display 114 of the electronic device. In still other embodiments, the zoom monitoring engine 320 can be used to determine whether one or more images being presented on a remote display of an external electronic device as captured in a video stream by the one or more imagers 308 occupy at least a predefined threshold area of the display 114 as will be described below with reference to FIG. 4.

The image quality analyzer 322 can be configured to determine what image quality level is required when the one or more processors 305 cause the communication device 307 to request video streams from external electronic devices. For example, if the one or more imagers 308 are simply in the viewfinder mode with their captured video stream being only presented on the display 114 of the electronic device 110, the image quality analyzer 322 may cause the one or more processors 305 to request via the communication device 307 that the video stream transmitted by an external electronic device be at a first, lower image quality level than when those same images are being stored in the memory 306 of the electronic device 110. In this latter case, the image quality analyzer 322 may cause the one or more processors 305 to request via the communication device 307 that the video stream transmitted by an external electronic device be at a second, higher image quality level, and so forth, as previously described.

In one or more embodiments, each of the display detection engine 319, the zoom monitoring engine 320, the artificial intelligence engine 321, the image quality analyzer 322, and the context engine 323 is operable with the one or more processors 305. In some embodiments, the one or more processors 305 can control the display detection engine 319, the zoom monitoring engine 320, the artificial intelligence engine 321, the image quality analyzer 322, and the context engine 323. In other embodiments, each of the display detection engine 319, the zoom monitoring engine 320, the artificial intelligence engine 321, the image quality analyzer 322, and the context engine 323 can operate independently, delivering information to the one or more processors 305. The display detection engine 319, the zoom monitoring engine 320, the artificial intelligence engine 321, the image quality analyzer 322, and the context engine 323 can each receive data from the various sensors 313. In one or more embodiments, the one or more processors 305 are configured to perform the operations of the display detection engine 319, the zoom monitoring engine 320, the artificial intelligence engine 321, the image quality analyzer 322, and the context engine 323.

When executing operations such as those method steps described above with reference to FIGS. 1 and 2, in one or more embodiments the one or more imagers 308 capture one or more images being presented on a remote display of an external electronic device in a first video stream. Thereafter, in accordance with the method of FIG. 1, the one or more processors 305 cause the communication device 307 to transmit a first request to the external electronic device for a second video stream comprising the one or more images being presented on the remote display. In one or more embodiments, in response to the communication device 307 receiving the second video stream, the one or more processors 305 replace any presentation of the first video stream on the display 114 with another presentation of the second video stream. Advantageously, any visual distortion occurring on the display 114 due to the presentation of the first video stream is eliminated when the second video stream is presented on the display 114.

The image quality analyzer 322 can operate in tandem with the one or more processors 305 to specify image quality levels for video streams requested from external electronic devices. For example, in one or more embodiments the image quality analyzer 322 can identify a number of pixels per area suitable for presentation on the display 114, i.e., that are commensurate with an image resolution presentation capability of the display 114. Accordingly, when the image quality analyzer 322 is operative, the one or more images of the second video stream will comprise the first number of pixels per area.

However, when the one or more processors 305 receive user input from the user interface 304 causing the initiation of a storage procedure storing at least one image from the second video stream in the memory 306, in one or more embodiments in response to this user input the image quality analyzer 322 can determine a second, higher number of pixels per unit area for the images to be stored. Accordingly, in one or more embodiments the one or more processors 305 then, in response to the user input, cause the communication device 307 to transmit a second request to the external electronic device for a third video stream comprising the one or more images being presented on the remote display. In one or more embodiments, this second request comprises a request for the one or more images of the third video stream to include the one or more images at the second, higher number of pixels per unit area. Accordingly, the one or more images of the third video stream will each comprise a second number of pixels per unit area that is greater than the first number of pixels per unit area.

The zoom monitoring engine 320 can similarly operate in tandem with the one or more processors 305. For example, when the one or more processors 305 receive another user input from the user interface 304 causing a zoom operation to occur, e.g., when the other user input causes only a portion of the one or more images of the third video stream to be presented on the display 114, the zoom monitoring engine 320 can identify a location of the portion in the one or more images and/or a size of the portion in the one or more images. The zoom monitoring engine 320 can then relay this information to the one or more processors 305.

In one or more embodiments, in response to receiving this information, the one or more processors 305 can cause the communication device 307 to transmit a third request to the external electronic device for a fourth video stream comprising only the portion of the one or more images being presented on the remote display of the external electronic device as identified by the zoom monitoring engine 320. Since the fourth video stream comprises only a portion of the one or more images in the third video stream, the one or more processors 305 can request smaller image files corresponding only to the identified portion. Accordingly, in one or more embodiments the fourth video stream comprises a third number of pixels per unit area that is greater than the first number of pixels per unit area of the second video stream, but that is less than the second number of pixels per unit area of the third video stream. This operation of the zoom monitoring engine 320 will be described in more detail below with reference to FIG. 5.

Now that various hardware components have been described, attention will be turned to additional methods of using electronic devices in accordance with one or more embodiments of the disclosure. Turning now to FIG. 4, illustrated therein is another explanatory method 400 for the electronic devices 110 of FIG. 3. Alternate methods will be described thereafter with reference to subsequent figures.

Beginning at step 401, the user 108 is once again directing the imager, e.g., camera (326), of the electronic device 110 toward the external electronic device 113 that includes a remote display 111. One or more images 112 are being presented on the remote display 111 of the external electronic device 113. The imager is capturing the one or more images 112 being presented on the remote display 111 of the external electronic device 113 in a video stream 115 that the one or more processors (305) are presenting on the local display 114 of the electronic device 110. As shown at step 401, the user 108 has the imager zoomed out so that the video stream 115 occupies only a small portion of the local display 114 of the electronic device 110.

At step 402, the one or more processors (305), optionally acting in tandem with one or both of the display detection engine (319) and/or the artificial intelligence engine (321), detect from this first video stream 115 that the one or more images 112 being presented on the remote display 111 of the external electronic device 113 are present in the video stream 115. This could be done automatically in one or more embodiments using any of the techniques described above with reference to FIG. 6. Other techniques for performing this automatic detection will be obvious to those of ordinary skill in the art having the benefit of this disclosure.

At decision 403, the one or more processors 305, optionally using the zoom monitoring engine 320, determine, in response to detecting the one or more images 112 appearing in the video stream 115, whether the one or more images 112 appearing in the video stream 115 occupy at least a predefined area threshold 408 of the local display 114 of the electronic device 110. Embodiments of the disclosure contemplate that operation of the electronic device 110 can be simplified in one or more embodiments by limiting instances of transmitting requests to external electronic devices for alternate video streams to only situations where the one or more images 112 appearing in the video stream 115 occupy at least a predefined area threshold 408 of the local display 114, such as fifty, sixty, seventy, seventy-five or more percent of the local display 114. If, for example, the user 108 is taking a picture of a person using the imager and a television happens to be in the background, it could be a nuisance for the user 108 if the one or more processors 305 automatically switched to only presenting the one or more images 112 from a second video stream rather than presenting the field of view as captured by the imager of the electronic device 110. Accordingly, in one or more embodiments decision 403 ensures that at least a minimum area of the local display 114 of the electronic device 110 is occupied by the one or more images 112 of the video stream 115 prior to requesting any additional video streams from any external electronic devices.

At step 401, the one or more images 112 appearing in the video stream 115 on the local display 114 of the electronic device 110 does not occupy or exceed the predefined area threshold 408. Accordingly, step 404 precludes any transmission of any request for any video stream from an external electronic device in response to the detection of the one or more images 112 being present in the video stream 115 being displayed at step 402.

However, at step 405, the user 107 has delivered user input 409 to the local display 114 executing a zoom operation causing the one or more images 112 of the video stream 115 to exceed the predefined area threshold 408, which in this example is at leas fifty-percent of the area of the local display 114 of the electronic device 110. This is detected at decision 403, which causes the method 400 to move to step 406 where the one or more processors (305) of the electronic device 110 cause the communication device (307) to transmit a request to the external electronic device 113 for a second video stream comprising the one or more images 112 being presented on the remote display 111 of the external electronic device 113. This video stream is received at step 407. The method 400 can thereafter perform as described above with reference to step 107 of FIG. 1.

Figure 4:
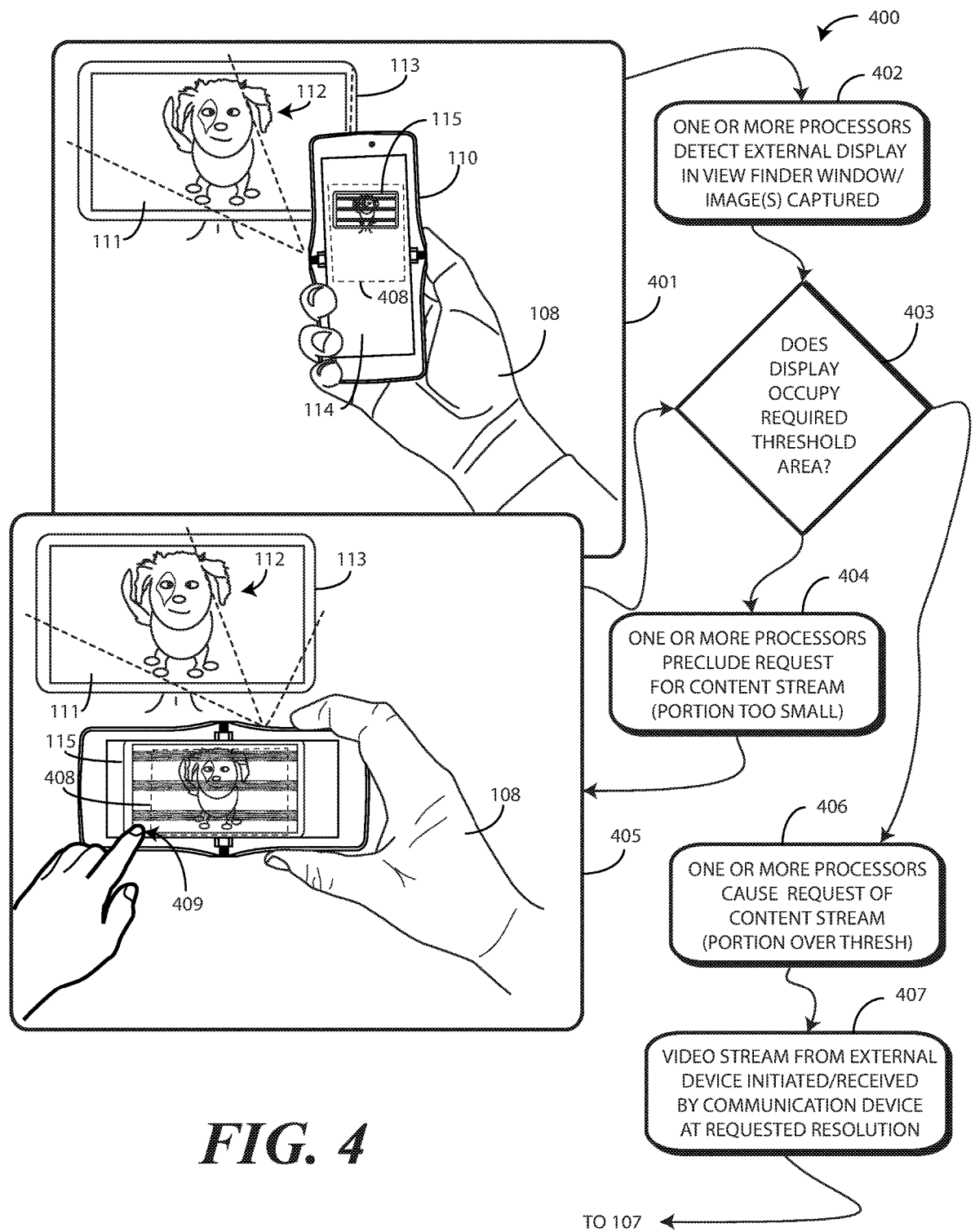
FIG. 4 illustrates still other explanatory method steps in accordance with one or more embodiments of the disclosure.

Using the method 400 of FIG. 4, the transmission of requests for a video stream from the external electronic device 113 comprising the one or more images 112 being presented on the remote display 111 of the external electronic device 113 advantageously occurs only when the one or more images 112 appearing in the first video stream 115 occupy an area of the local display 114 of the electronic device 110 that is equal to or greater than at least a predefined area threshold 408. In one or more embodiments, this predefined area threshold 408 can be set by the user 108 using a menu of control settings of the electronic device 110.

The zoom monitoring engine (320) can be used in other ways as well. For example, in other embodiments, the user 108 of the electronic device 110 can cause the image resolution or quality level to change by performing zoom operations when capturing images from the remote display 111 of the external electronic device 113. Turning now to FIG. 5, illustrated therein is one such method.

Beginning at step 501, in response to the one or more processors (305) of the electronic device 110 detecting one or more images 112 being presented by a remote display 111 of an external electronic device 113 being present in a video stream being presented on a display 114 of the electronic device 110, the one or more processors (305) of the electronic device 110 have replaced, on the local display 114 of the electronic device 110, the first video stream with a second video stream 117 being received from the external electronic device 113 and comprising the one or more images 112. In one or more embodiments, the request transmitted to the external electronic device 113 causing the external electronic device 113 to transmit the second video stream 117 specified a first image quality level for the one or more images 112 of the second video stream 117. Accordingly, at step 501 the one or more images 112 included with the second video stream 117 are delivered at the first image quality level.

In this illustrative embodiment, the data 510 corresponding to the one or more images 112 is stored in the external electronic device 113 in a RAW data format. Accordingly, each image of the one or more images 112 comprises on the order of 100 million pixels. However, when the external electronic device 113 renders the one or more images 112 on the remote display 111 of the external electronic device 113, it has a lesser image resolution presentation capability. Accordingly, the external electronic device 113 may process the RAW data corresponding to the one or more images 112 to reduce it to a level of, say, a 1920×1080 resolution for presentation on the remote display 111.

At step 501, when the electronic device 110 is receiving the second video stream 117, the user 108 delivers user input 517 initiating recording or storage of at least one image of the one or more images 112 from the second video stream 117 into a memory (306) of the electronic device 110. At step 502, the one or more processors (305) of the electronic device 110 receive this user input 517 from the user interface (304) of the electronic device 110 causing the storage of at least one image of the one or more images 112 from the second video stream 117 into the memory (306) of the electronic device 110 (or alternatively cloud storage or another storage device external to the electronic device 110).

In response to detecting this "recording" operation being initiated, in one or more embodiments step 503 comprises the one or more processors (305) of the electronic device 110 transmitting a second request for a third video stream from the external electronic device 113 comprising the one or more images 112. Since a recording operation has been initiated, this second request transmitted at step 503 specifies a second image quality level for the third video stream that is a higher image quality level than the first image quality level of the second video stream 117 being transmitted before the recording operation was initiated by the user input 517 at step 501. In this example, the second image quality level comprises the RAW data format. Thus, rather than being sent in a compressed format in the second video stream 117, in one or more embodiments the second request for the third video stream stent at step 503 comprises requesting the one or more images 112 included in the third video stream to be transmitted in the RAW data format.

At step 504, the communication device (307) of the electronic device 110 begins receiving the third video stream from the external electronic device 113. As shown at step 505, the communication device (307) of the electronic device 110 is receiving the third video stream 511, with hits second, higher image quality level, from the external electronic device 113. Said differently, at step 505 the communication device (307) of the electronic device 110 is receiving the third video stream 511 with the one or more images 112 in the third video stream 511 being in the RAW data format. The one or more processors (305) of the electronic device 110 present the third video stream 511 on the local display 114 of the electronic device 110, as well as record the one or more images 112 into the memory (306) of the electronic device 110 (or into a cloud or external storage device) at step 505.

At step 505, when the electronic device 110 is receiving the third video stream 511, the user 108 delivers another user input 512 causing only a portion 513 of the one or more images 112 from the third video stream 511 to appear on the local display 114 of the electronic device 110. In one or more embodiments, the one or more processors (305) of the electronic device 110, optionally operating in tandem with the zoom monitoring engine (320) identify a location 514 of the portion 513 and/or a size 515 of the portion 513 within the one or more images 12 being presented on the remote display 111 of the external electronic device 113 at step 506.

At step 507, the one or more processors (305) of the electronic device 110 cause the communication device (307) to transmit another request to the external electronic device 113 for a fourth video stream. Since the zoom operation performed by the user 108 at step 505 has caused only the portion 513 of the one or more images 112 to be visible on the local display 114 of the electronic device 110, rather than requesting the entire images, i.e., all 100 million pixels of each of the one or more images 112, to be included in the fourth video stream, in one or more embodiments the request of step 507 request only the portion 513 of the one or more images 112 to be included in the fourth video stream. Accordingly, this will result in the amount of data being transmitted in the fourth video stream to be less than that transmitted in the third video stream 511, when all 100 million pixels of each image of the one or more images 112 were being transmitted. Said differently, this request for the fourth video stream causes the fourth video stream to have a bitrate associated therewith that is less than the bitrate associated with the third video stream 511.

At step 508 the communication device (307) receives the fourth video stream. As shown at step 509, the electronic device 110 is receiving the fourth video stream 516, with the fourth video stream 516 comprising only the portion 513 of the one or more images 112 rather than the entire image. Accordingly, rather than receiving 100 million pixel images, at step 508 the electronic device 110 receives only 20 million pixel portions of the one or more images 112, thereby reducing the amount of data being transmitted from the external electronic device 113 to the electronic device 110 as a function of the zoom operation being performed at step 505 while the third video stream 511 was being recorded. In one or more embodiments, the portion 513 of the one or more images 112 of the fourth video stream 516 each comprise a third number of pixels per unit area that is greater than the first number of pixels per unit area of the second video stream 117 and less than the second number of pixels per unit area of the third video stream 511.

Figure 5:
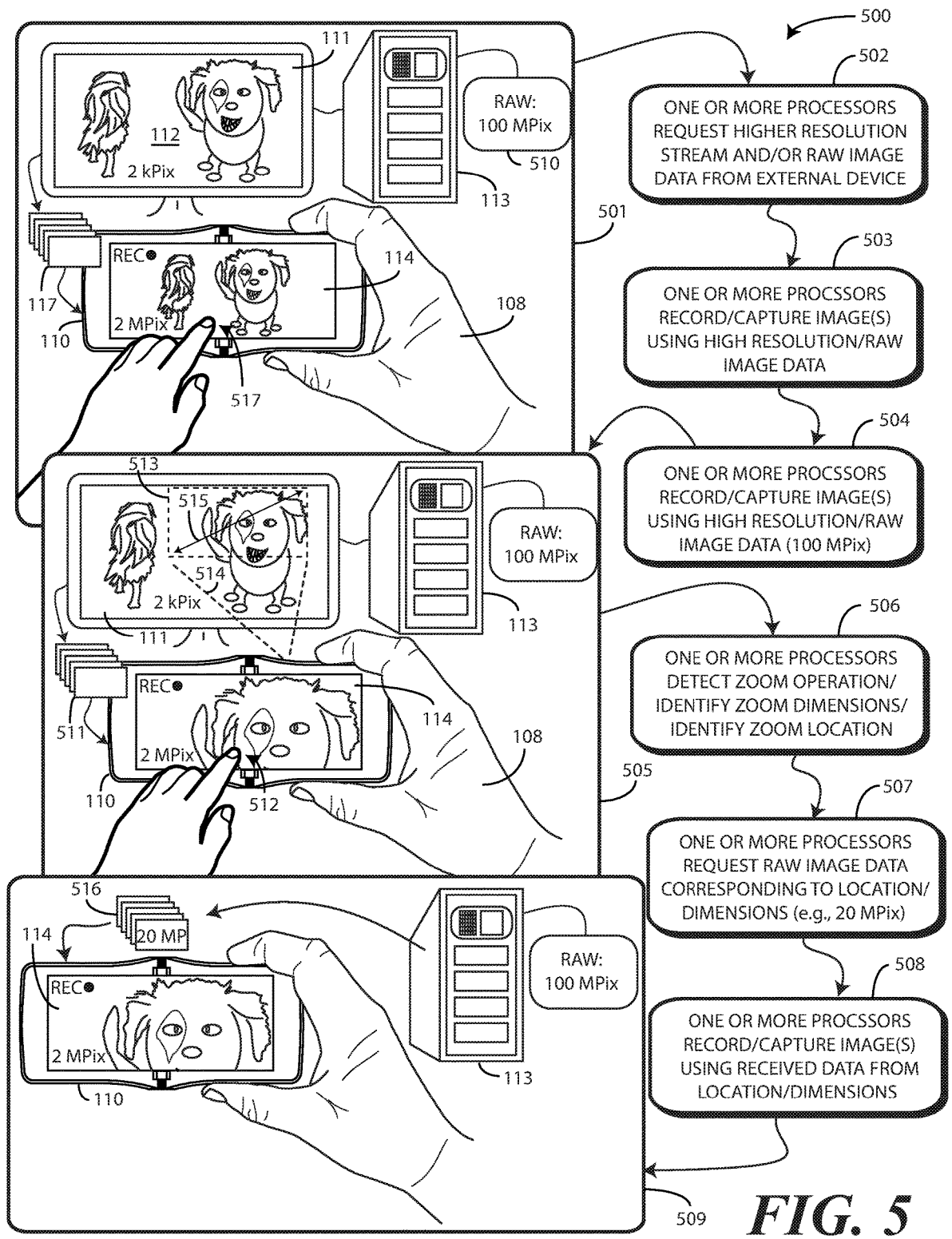
FIG. 5 illustrates other explanatory method steps in accordance with one or more embodiments of the disclosure.

Thus, using the method 500 of FIG. 5, when the user 108 is using the electronic device 110 to capture and record the one or more images 112 being presented on the remote display 111 of the external electronic device 113, the one or more processors (305) of the electronic device 110 cause, via the request transmitted at step 502, the external electronic device 113 to transmit the RAW video to the electronic device 110 in the second video stream 117. The user 108 is then able to reduce the amount of data being received from the external electronic device 113 by performing a zoom operation at step 505 while the recording is occurring.

In one or more embodiments, when the user 108 causes zoom operation of step 505 to result in only a portion of the one or more images 112 being presented on the remote display 111 of the external electronic device to be presented on the local display 114 of the electronic device 110, the one or more processors (305) of the electronic device 110 cause the external electronic device 113, via the request transmitted at step 507, to transmit a fourth video stream 516 having only a portion of the data from the one or more images 112. Thus, if the RAW video format includes 100 million pixels per image, but the user has used the zoom feature to cause only one-fifth of the one or more images 112 being presented on the remote display 111 of the external electronic device 113 to be visible on the local display 114 of the electronic device 110, in one or more embodiments the one or more processors (305) of the electronic device 110 cause the external electronic device 113, via the request transmitted at step 507, to transmit only pixels corresponding to that portion 513. Thus, the external electronic device 113 transmits at step 509 the fourth video stream 516, which contains 20 million pixels per image rather than the 100 million, and so forth.

Figure 8:
FIG. 8 illustrates various embodiments of the disclosure.

Turning now to FIG. 8, illustrated therein are various embodiments of the disclosure. The embodiments of FIG. 8 are shown as labeled boxes in FIG. 8 in accordance with 37 CFR § 1.83(a) due to the fact that the components of these embodiments have been illustrated in detail in FIGS. 1-6, which precede FIG. 8. Accordingly, since these items have previously been illustrated and described, 37 CFR § 1.83(a) indicates that their repeated illustration is no longer essential for a proper understanding of these embodiments. Thus, the embodiments are shown as labeled boxes in accordance with 37 CFR §1.83(a), which states that these embodiments "should be illustrated in the drawing in the form of a graphical drawing symbol or a labeled representation (e.g., a labeled rectangular box)."

At 801, a method in an electronic device comprises detecting, with one or more processors of the electronic device, one or more images being presented on a remote display of an external electronic device appearing in a first video stream captured by an imager of the electronic device. At 801, the method comprises causing, with the one or more processors, a communication device of the electronic device to establish electronic communication with the external electronic device in response to detecting the one or more images appearing in the first video stream.

At 801, the method comprises transmitting, by the one or more processors with the communication device to the external electronic device, a first request for a second video stream comprising the one or more images being presented on the remote display of the external electronic device. At 801, the method comprises receiving, with the communication device, the second video stream from the external electronic device in response to the first request. At 801, the method comprises presenting, by the one or more processors, the second video stream on a local display of the electronic device.

At 802, the method of 801 further comprises displaying, by the one or more processors prior to detecting the one or more images appearing in the first video stream, the first video stream on the local display of the electronic device. At 802, the method comprises replacing, by the one or more processors on the local display of the electronic device, the displaying of the first video stream with the presenting of the second video stream in response to receiving the second video stream.

At 803, the first request of 802 specifies a first image quality level for the one or more images of the second video stream. At 804, the first image quality level of 803 comprises a first image resolution level for the one or more images of the second video stream. At 805, the first image resolution level of 804 corresponds to an image resolution presentation capability of the local display of the electronic device.

At 806, the method of 803 further comprises receiving, with the one or more processors from a user interface of the electronic device, a first user input causing storage of at least one image of the one or more images from the second video stream in a memory of the electronic device. At 806, the method comprises transmitting, by the one or more processors in response to the first user input, a second request for a third video stream comprising the one or more images. At 806, the second request specifies a second image quality level for the third video stream that is a higher image quality level than the first image quality level. At 807, the second image quality level of 806 comprises a raw image file format of the one or more images.

At 808, the method of 806 further comprises receiving, with the one or more processors from the user interface of the electronic device, a second user input causing only a portion of the one or more images from the third video stream to be presented on the local display of the electronic device. At 808, the method comprises transmitting, by the one or more processors in response to the second user input, a third request for a fourth video stream comprising only the portion of the one or more images. At 809, the one or more images of the fourth video stream of 808 have a bitrate associated therewith that is less than another bitrate associated with the third video stream.

At 810, the method of 808 further comprises identifying, by the one or more processors, a location of the portion in the one or more images and a size of the portion in the one or more images. AT 810, the third request comprises the location of the portion and the size of the portion.

At 811, the method of 803 further comprises determining, with the one or more processors in response to detecting the one or more images appearing in the first video stream, whether the one or more images appearing in the first video stream occupy at least a predefined area threshold of the local display of the electronic device when being displayed on the local display of the electronic device. At 811, the transmitting of the first request occurs only when the one or more images appearing in the first video stream occupy an area of the local display equal to or greater than the at least a predefined area threshold.

At 812, an electronic device comprises an imager capturing one or more images being presented on a remote display of an external electronic device in a first video stream. At 812, the electronic device comprises a display, a communication device, and one or more processors operable with the communication device and the display.

At 812, the one or more processors cause the communication device to transmit a first request to the external electronic device for a second video stream comprising the one or more images being presented on the remote display. At 812, the one or more processors, in response to the communication device receiving the second video stream, replace a presentation of the first video stream on the display with another presentation of the second video stream. At 813, the one or more images of the second video stream of 812 each comprise a first number of pixels per unit area.

At 814, the electronic device of 813 further comprises a user interface and a memory that are operable with the one or more processors. At 814, the one or more processors receive user input from the user interface storing at least one image from the second video stream in the memory. At 814, in response to the user input, the one or more processors cause the communication device to transmit a second request to the external electronic device for a third video stream comprising the one or more images being presented on the remote display. At 815, the one or more images of the third video stream of 814 each comprise a second number of pixels per unit area that is greater than the first number of pixels per unit area.

At 816, the one or more processors of 815 receive another user input from the user interface causing only a portion of the one or more images of the third video stream to be presented on the display. At 816, in response to the another user input, the one or more processors cause the communication device to transmit a third request to the external electronic device for a fourth video stream comprising only the portion of the one or more images being presented on the remote display. At 817, the portion of the one or more images of the fourth video stream of 816 each comprise a third number of pixels per unit area that is greater than the first number of pixels per unit area and less than the second number of pixels per unit area.

At 818, a method in an electronic device comprises detecting, by one or more processors from a first video stream captured by an imager, one or more images being presented by a remote display of an external electronic device. At 818, the method comprises receiving, with a communication device operable with the one or more processors in response to the detecting, a second video stream comprising the one or more images being presented on the remote display. At 818, the method comprises replacing, by the one or more processors on a local display of the electronic device, presentation of the first video stream with the second video stream.

At 819, the method of 818 further comprises receiving, with the communication device in response to the one or more processors receiving user input at a user interface causing the one or more images of the second video stream to be recorded, a third video stream comprising the one or more images being presented on the remote display. At 819, the third video stream has a greater pixel per area resolution per image than the second video stream.

At 820, the method of 819 further comprises receiving, with the communication device in response to the one or more processors receiving another user input at the user interface causing only a portion of the one or more images of the third video stream to be presented on the local display, a fourth video stream comprising only the portion of the one or more images being presented on the remote display.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with one or more processors of the electronic device, one or more images being presented on a remote display of an external electronic device appearing in a first video stream captured by an imager of the electronic device;
   causing, with the one or more processors, a communication device of the electronic device to establish electronic communication with the external electronic device in response to detecting the one or more images appearing in the first video stream;
   transmitting, by the one or more processors with the communication device to the external electronic device, a first request for a second video stream comprising the one or more images being presented on the remote display of the external electronic device;
   receiving, with the communication device, the second video stream from the external electronic device in response to the first request; and
   presenting, by the one or more processors, the second video stream on a local display of the electronic device.

2. The method of claim 1, further comprising:
   displaying, by the one or more processors prior to detecting the one or more images appearing in the first video stream, the first video stream on the local display of the electronic device; and
   replacing, by the one or more processors on the local display of the electronic device, the displaying of the first video stream with the presenting of the second video stream in response to receiving the second video stream.

3. The method of claim 2, the first request specifying a first image quality level for the one or more images of the second video stream.

4. The method of claim 3, wherein the first image quality level comprises a first image resolution level for the one or more images of the second video stream.

5. The method of claim 4, the first image resolution level corresponding to an image resolution presentation capability of the local display of the electronic device.

6. The method of claim 3, further comprising:
   receiving, with the one or more processors from a user interface of the electronic device, a first user input causing storage of at least one image of the one or more images from the second video stream in a memory of the electronic device; and
   transmitting, by the one or more processors in response to the first user input, a second request for a third video stream comprising the one or more images, the second request specifying a second image quality level for the third video stream that is a higher image quality level than the first image quality level.

7. The method of claim 6, wherein the second image quality level comprises a raw image file format of the one or more images.

8. The method of claim 6, further comprising:
   receiving, with the one or more processors from the user interface of the electronic device, a second user input causing only a portion of the one or more images from the third video stream to be presented on the local display of the electronic device; and
   transmitting, by the one or more processors in response to the second user input, a third request for a fourth video stream comprising only the portion of the one or more images.

9. The method of claim 8, the one or more images of the fourth video stream having a bitrate associated therewith that is less than another bitrate associated with the third video stream.

10. The method of claim 8, further comprising identifying, by the one or more processors, a location of the portion in the one or more images and a size of the portion in the one or more images, the third request comprising the location of the portion and the size of the portion.

11. The method of claim 3, further comprising determining, with the one or more processors in response to detecting the one or more images appearing in the first video stream, whether the one or more images appearing in the first video stream occupy at least a predefined area threshold of the local display of the electronic device when being displayed on the local display of the electronic device, wherein the transmitting of the first request occurs only when the one or more images appearing in the first video stream occupy an area of the local display equal to or greater than the at least a predefined area threshold.

12. An electronic device, comprising:
   an imager capturing one or more images being presented on a remote display of an external electronic device in a first video stream;
   a display;
   a communication device; and
   one or more processors operable with the communication device and the display;
   the one or more processors causing the communication device to transmit a first request to the external electronic device for a second video stream comprising the one or more images being presented on the remote display and, in response to the communication device receiving the second video stream, replacing a presentation of the first video stream on the display with another presentation of the second video stream.

13. The electronic device of claim 12, the one or more images of the second video stream each comprising a first number of pixels per unit area.

14. The electronic device of claim 13, further comprising a user interface and a memory, operable with the one or more processors, the one or more processors receiving user input from the user interface storing at least one image from the second video stream in the memory and, in response to the user input, causing the communication device to transmit a second request to the external electronic device for a third video stream comprising the one or more images being presented on the remote display.

15. The electronic device of claim 14, the one or more images of the third video stream each comprising a second number of pixels per unit area that is greater than the first number of pixels per unit area.

16. The electronic device of claim 15, the one or more processors receiving another user input from the user interface causing only a portion of the one or more images of the third video stream to be presented on the display and, in response to the another user input, causing the communication device to transmit a third request to the external electronic device for a fourth video stream comprising only the portion of the one or more images being presented on the remote display.

17. The electronic device of claim 16, the portion of the one or more images of the fourth video stream each comprising a third number of pixels per unit area that is greater than the first number of pixels per unit area and less than the second number of pixels per unit area.

18. A method in an electronic device, the method comprising:
- detecting, by one or more processors from a first video stream captured by an imager, one or more images being presented by a remote display of an external electronic device;
- receiving, with a communication device operable with the one or more processors in response to the detecting, a second video stream comprising the one or more images being presented on the remote display; and
- replacing, by the one or more processors on a local display of the electronic device, presentation of the first video stream with the second video stream.

19. The method of claim 18, further comprising receiving, with the communication device in response to the one or more processors receiving user input at a user interface causing the one or more images of the second video stream to be recorded, a third video stream comprising the one or more images being presented on the remote display, the third video stream having a greater pixel per area resolution per image than the second video stream.

20. The method of claim 19, further comprising receiving, with the communication device in response to the one or more processors receiving another user input at the user interface causing only a portion of the one or more images of the third video stream to be presented on the local display, a fourth video stream comprising only the portion of the one or more images being presented on the remote display.

* * * * *